United States Patent [19]

Remus

[11] 3,964,049

[45] June 15, 1976

[54] VERTICAL SCALE TAKE UP MECHANISM

[75] Inventor: Casimer Frank Remus, Tunkhannock, Pa.

[73] Assignee: The Bendix Corporation, Teterboro, N.J.

[22] Filed: Mar. 13, 1975

[21] Appl. No.: 558,192

[52] U.S. Cl. .................................. 340/317; 74/10 R
[51] Int. Cl.² .................. G08B 23/00; F16H 35/18
[58] Field of Search ........................... 340/317, 316

[56] References Cited
UNITED STATES PATENTS

| | | | |
|---|---|---|---|
| 1,089,466 | 3/1914 | Frude | 340/260 |
| 2,521,284 | 9/1950 | Clough | 340/316 |
| 3,117,312 | 1/1964 | Watson | 340/316 |
| 3,633,200 | 1/1972 | Ellison | 340/317 |
| 3,699,564 | 10/1972 | Hodge | 340/317 |

*Primary Examiner*—Thomas B. Habecker
*Attorney, Agent, or Firm*—S. H. Hartz; Anthony F. Cuoco

[57] ABSTRACT

A vertical scale indicator has an index movable relative to a scale for indicating a condition sensed by a signal condition device. The index is supported on a flexible band wound on two drums. One drum is driven directly by a servomotor responsive to signals from the signal condition device and the other drum is driven by the servomotor through spring means for providing relative rotation between the drums to accommodate rotation of the drums through different angles in accordance with the amounts of tape wound on the drums.

6 Claims, 5 Drawing Figures

VERTICAL SCALE TAKE UP MECHANISM

The invention relates to indicators especially adapted for aircraft and more particularly to vertical scale indicators.

PRIOR ART

U.S. Pat. No. 3,633,200 issued Jan. 4, 1972 and assigned to the same assignee as the present application, shows a vertical scale indicator having a servo motor for rotating a pulley in one direction and a drum is rotated in the opposite direction by a spring. A flexible band with an index thereon is wound on the pulley and drum and the index is moved in one direction by the motor and in the opposite direction by the spring. With this arrangement the spring moves the index off the scale when power is removed from the servo motor.

U.S. Pat. No. 3,103,657 issued Sept. 10, 1963 shows a temperature indicator in which one bite or loop of an endless temperature registering band rides around a drum driven by an electric motor and the other end of the band is supported by a sprocket drum which the band drives. However, with this arrangement the length of the band is limited to the size of the instrument and if an exceptionally long band is required the instrument must be quite large. In aircraft where space on the instrument panel is at a premium this creates a very serious problem.

SUMMARY OF THE INVENTION

A vertical scale indicator constructed according to the invention permits the tape to remain in its last position when the motor is deenergized and will accommodate a tape of any length. In one embodiment of the invention one end of the tape is wound on a first drum and the other end of the tape is wound on a second drum. A cable has one end wound on the first drum and the other end wound on a pulley yieldingly connected by a spring drive to the second drum. The first drum is rotated in both directions by a servomotor and the second drum is driven in one direction by the tape as it winds on the first drum and in the opposite direction by the cable as it winds on the pulley. The spring drive connecting the pulley to the second drum accommodates relative rotation of the two drums in accordance with the amount of tape wound on the drums. With this arrangement tapes of any length can be used without enlarging the instrument and the tape remains in its last position when the motor is deenergized.

The invention contemplates an indicator comprising scale means and index means movable relative to one another for indicating a condition sensed by a signal condition device, a servomotor responsive to signals from said device, a pair of drums, a flexible band having one of the scale means or index means thereon wound on the drums, means other than the flexible band drivably connecting the servomotor to the drums for positively rotating one drum in a direction for winding the flexible band thereon and for positively rotating the other drum in the opposite direction for winding the flexible band thereon to move the scale means or index means in both directions, said driving means including spring means between the driving means and only one drum for accommodating only relative rotation between the drums as the flexible band winds from one drum to the other when the drums rotate through different angles in accordance with the amounts of flexible band wound on the drums.

DRAWING

FIG. 1 is a side view of a vertical scale indicator constructed according to the invention, FIG. 2 is a top view thereof, FIG. 3 is a vertical section taken approximately on the line 3—3 of FIG. 1, FIG. 4 is a schematic showing another embodiment of the invention, and FIG. 5 is a schematic wiring diagram showing the electrical circuit for operating the indicator.

DETAILED DESCRIPTION OF THE INVENTION

Figure 2:
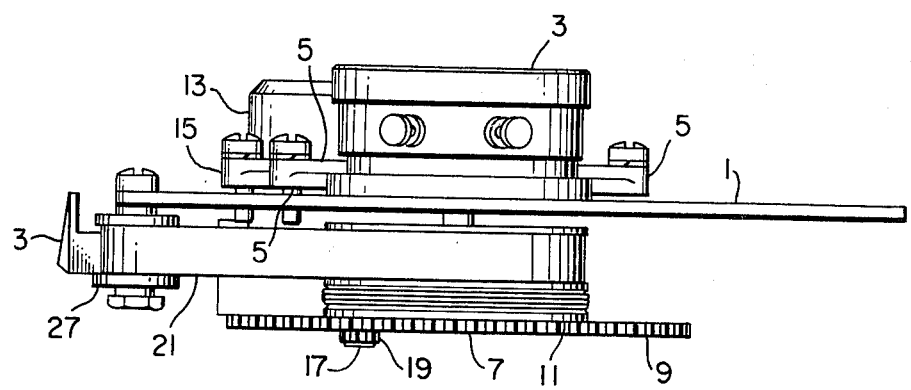
Figure 1:
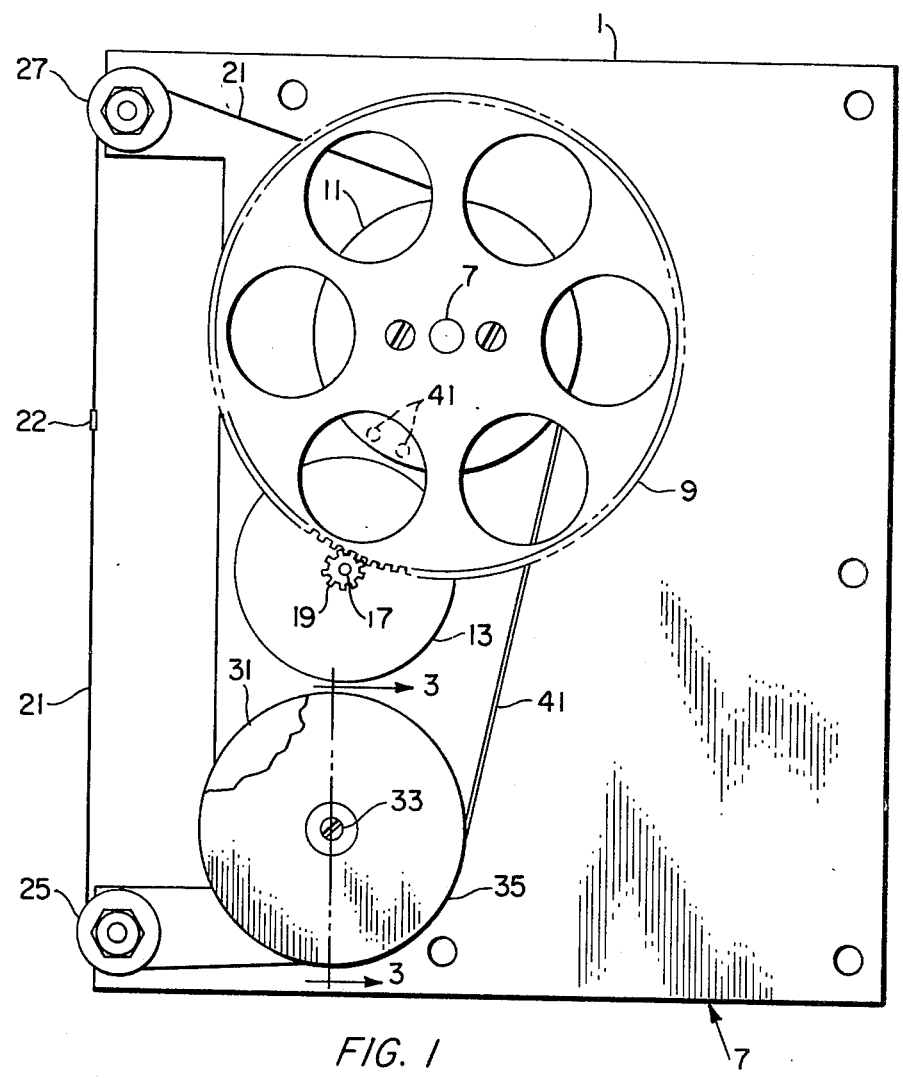
Figure 3:
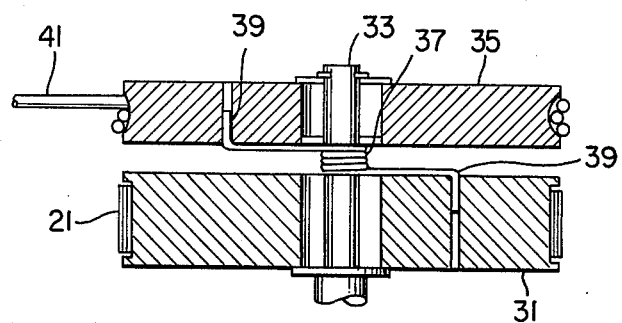

A vertical scale instrument constructed according to the invention is generally of the kind shown and described in U.S. Pat. No. 3,633,200 referred to above. The vertical scale indicator has a mounting plate 1 with a follow up potentiometer 3 mounted on one side by clamps 5 and with the shaft 7 thereof extending through an aperture in the plate. A gear 9 is attached to a drum 11 and the gear and drum are mounted on potentiometer shaft 7 on the side of the plate opposite potentiometer 3. A servomotor 13 is secured to plate 1 by clamps 15 in an aperture in the plate so that the servomotor extends through the plate. The servomotor has a shaft 17 with a pinion 19 thereon meshing with gear 9. The servomotor drives drum 11 and potentiometer 3 in both directions.

A flexible band 21 with an index or a scale 22 thereon has one end attached to drum 11. The flexible band is guided by ball bearing rollers 25 and 27 rotatably mounted at the corners of mounting plate 1 on the same side of plate 1 as drum 11. The other end of flexible band 21 is attached to a drum 31 rotating on a shaft 33 on the same side of mounting plate 1 as drum 11. A pulley 35 is rotatably mounted on shaft 33 adjacent drum 31 and is drivably connected thereto by a coil spring 37 rotatable on shaft 33 and having arms 39 engaging drum 31 and pulley 35. Spring 37 provides a driving connection between pulley 35 and drum 31 yet permits relative rotation of the pulley and drum. A cable 41 has one end connected to pulley 35 and the other end connected to drum 11.

Servomotor 13 drives flexible band 21 in both directions. The flexible band may have an index 22 thereon which moves across a stationary scale (not shown) to indicate a condition, or the flexible band may have a scale thereon which moves past a stationary index. The latter arangement permits a longer tape to be used with a larger scale for more accurate indication. When motor 13 drives drum 11 in a clockwise direction flexible band 21 winds on drum 11, index 22 moves upwardly on the scale and flexible band 21 unwinds from drum 31 and rotates drum 31 in a clockwise direction. Cable 41 winds on pulley 35 and unwinds from drum 11. When motor 13 rotates drum 11 in a counterclockwise direction cable 41 winds on drum 11 and unwinds from pulley 35 and rotates drum 31 in a counterclockwise direction through spring 37. Flexible band 21 winds on drum 31, index 22 moves downwardly on the scale, and flexible band 21 unwinds from drum 11. Coil spring 37 permits relative rotation between pulley 35 and drum 31 to accomodate the relative rotation of drums 11 and 31 through different angles and at different speeds if the number of turns of flexible band 21 on drum 11 differ from the number of turns of flexible band on drum 31. Flexible band 21 rotates drum 31 in one direction and cable 41 rotates drum 31 in the opposite direction.

The flexible band may be made any length and any number of turns may be wound on drums 11 and 31. The number of turns of cable 41 wound on drum 11 and pulley 35 should be equal to the number of turns of flexible band 21 on drums 11 and 31, respectively. If drum 11 makes more than one rotation then potentiometer 3 should be geared to drum 11 to make only one rotation while drum 11 makes the desired number of rotations required by the length of the flexible band. In some instances it may be desirable to use a multiturn potentiometer along the lines described in U.S. Pat. No. 3,103,657 referred to above.

An indicator constructed according to the invention requires less power to operate than that shown in U.S. Pat. No. 3,633,200 because the motor does not have to overcome return spring torque.

Instead of using a pulley 35 and cable 41 a gear identical to gear 9 may be substituted for pulley 35 and mesh with gear 19 on motor shaft 17. The gear may be drivably connected to drum 31 by a spring 37 similarly to pulley 35.

Figure 4:
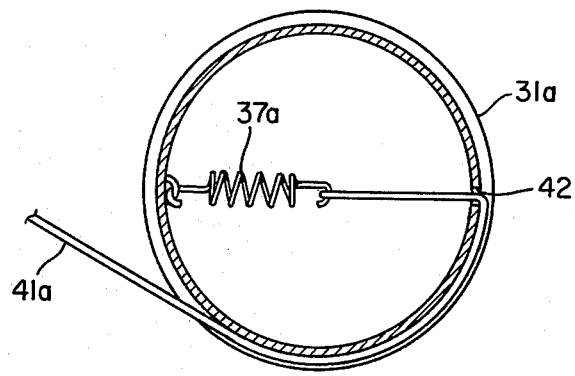

In the embodiment shown in FIG. 4, one end of cable 41a extends through an aperture 42 in the periphery of drum 31a and is attached to one end of a coil spring 37a having its other end attached to drum 31a. Spring 37a provides a driving connection between cable 41a and drum 31a yet permits relative rotation between drum 31a and drum 11.

Figure 5:
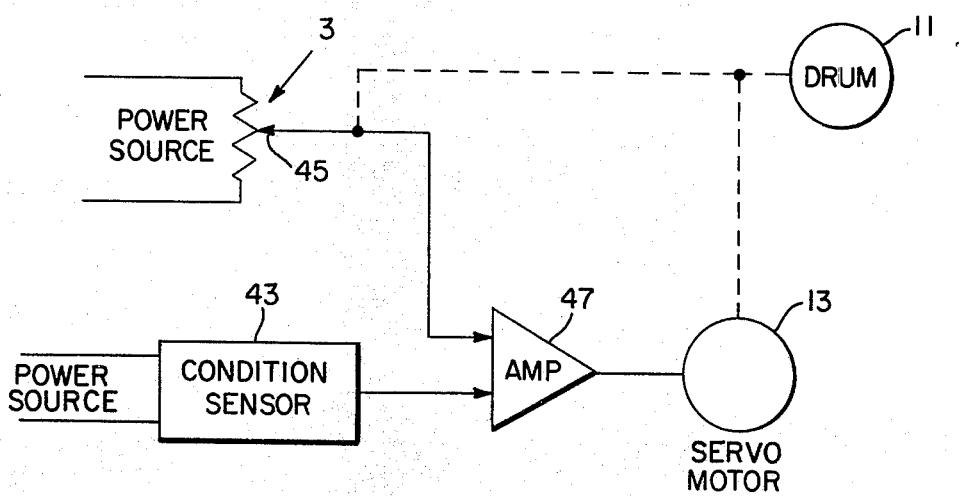

Referring to the schematic wiring diagram shown in FIG. 5, a condition sensor 43 for sensing oil temperature, oil pressure, or the like, is connected to a power source and provides an electrical signal corresponding to the sensed condition. Followup potentiometer 3 is electrically connected to the power source and with condition sensor 43 to the input of amplifier 47 where the condition signal and followup signal are algebraically summed. Servomotor 13 is electrically connected to the output of amplifier 47 and mechanically connected to drum 11 and movable tap 45 of potentiometer 3. Servomotor 13 moves tap 45 to a null position.

While the indicator is referred to as a vertical scale indicator, the term vertical is not intended to restrict the use of the indicator to a vertical position on the instrument panel, since the indicator may also be positioned horizontally on the instrument panel. The word vertical is used to describe the rectilinear movement of the indicator.

A vertical scale indicator constructed according to the invention permits the tape to remain in its last position when the motor is deenergized and will accommodate a tape of any length.

What is claimed is:

1. An indicator comprising scale means and index means movable relative to one another for indicating a condition sensed by a signal condition device, a servomotor responsive to signals from said device, a pair of drums, a flexible band having one of the scale means or index means thereon wound on the drums, means other than the flexible band drivably connecting the servomotor to the drums for positively rotating one drum in a direction for winding the flexible band thereon and for positively rotating the other drum in the opposite direction for winding the flexible band thereon to move the scale means or index means in both directions, said driving means including spring means between the driving means and only one drum for accommodating only relative rotation between the drums as the flexible band winds from one drum to the other when the drums rotate through different angles in accordance with the amounts of flexible band wound on the drums.

2. An indicator as described in claim 1 in which the means drivably connecting the servomotor to the drums includes gearing between the servomotor and one drum and a cable between the other drum and spring means.

3. An indicator as described in claim 2 in which the driving means includes a pulley for winding the cable and the spring means connects the pulley to the associated drum.

4. An indicator as described in claim 2 in which the spring means includes a spring connecting the cable to the associated drum.

5. An indicator as described in claim 1 in which the means drivably connecting the servomotor to the drums includes gearing between the servomotor and one drum and between the servomotor and the spring means associated with the other drum.

6. An indicator as described in claim 1 in which the means drivably connecting the servomotor to the drums includes gearing between the servomotor and both drums.

* * * * *